US012650842B2

(12) United States Patent
Zhao et al.

(10) Patent No.: US 12,650,842 B2
(45) Date of Patent: Jun. 9, 2026

(54) METHODS AND ELECTRONIC DEVICES FOR DETERMINING RESPONSE MESSAGE

(71) Applicant: Lenovo (Beijing) Limited, Beijing (CN)

(72) Inventors: Xuemeng Zhao, Beijing (CN); Jia Zhao, Beijing (CN); Qiushi Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/924,882

(22) Filed: Oct. 23, 2024

(65) Prior Publication Data

US 2025/0130803 A1 Apr. 24, 2025

(30) Foreign Application Priority Data

Oct. 24, 2023 (CN) .......................... 202311385773.1

(51) Int. Cl.
G06F 9/30 (2018.01)
(52) U.S. Cl.
CPC ................................. G06F 9/30076 (2013.01)
(58) Field of Classification Search
CPC ............. G06F 9/30076; G06F 16/3329; G06F 16/33331; Y02D 10/00
See application file for complete search history.

(56) References Cited

U.S. PATENT DOCUMENTS

| | | | |
|---|---|---|---|
| 12,222,992 B1* | 2/2025 | Cetoli | ..................... G06F 16/93 |
| 2015/0332672 A1* | 11/2015 | Akbacak | ............. G06F 16/3329 704/257 |
| 2021/0192134 A1* | 6/2021 | Yue | ..................... G06F 3/04895 |
| 2024/0354503 A1* | 10/2024 | Baruch | ................. G06F 16/345 |

* cited by examiner

*Primary Examiner* — William Spieler
(74) *Attorney, Agent, or Firm* — ANOVA LAW GROUP, PLLC

(57) ABSTRACT

A method for determining a response message includes: determining a target instruction indicated by a query information from a user and a target content to be responded to, the target instruction being configured to indicate a processing requirement for the target content; determining a target historical instruction similar to the target instruction from a historical instruction set, the historical instruction set including at least one historical instruction determined based on historical query information input by the user; determining an instruction intent corresponding to the target historical instruction as a target instruction intent of the target instruction; and determining a first response message for the query information using a first language processing model based on the target content and the target instruction intent of the target instruction.

18 Claims, 7 Drawing Sheets

S401

Obtaining query information input by a user

When there is not at least one target historical query information whose similarity to the query information satisfies the condition in the historical query information set, determining a target instruction indicated by the query information and a target content to be responded to — S404

When there exists at least one target historical query information whose similarity to the query information satisfies a condition in a historical query information set, obtaining a cached historical response message corresponding to the target historical query information — S402

Determining a target historical instruction similar to the target instruction from the historical instruction set — S405

Based on the query information, the at least one target historical query information and the historical response message corresponding to each target historical query information, determining a second response message for the query information using a second language processing model — S403

Determining an instruction intent of the target historical instruction as a target instruction intent of the target instruction — S406

Based on the target content and the target instruction intent of the target instruction, determining a first response message for the query information using a first language processing model — S407

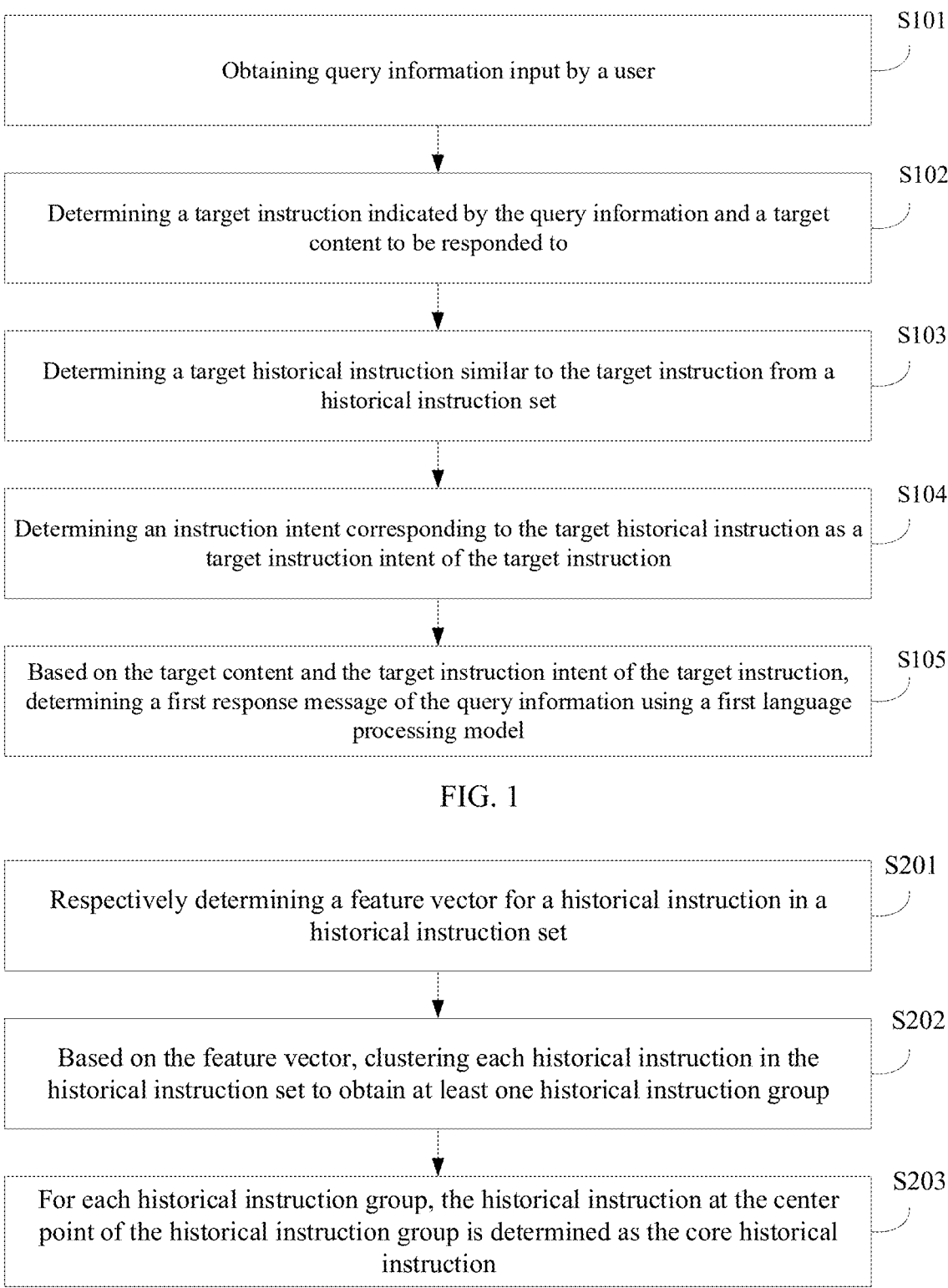

S101

Obtaining query information input by a user

S102

Determining a target instruction indicated by the query information and a target content to be responded to

S103

Determining a target historical instruction similar to the target instruction from a historical instruction set

S104

Determining an instruction intent corresponding to the target historical instruction as a target instruction intent of the target instruction

S105

Based on the target content and the target instruction intent of the target instruction, determining a first response message of the query information using a first language processing model

Respectively determining a feature vector for a historical instruction in a historical instruction set

S202

Based on the feature vector, clustering each historical instruction in the historical instruction set to obtain at least one historical instruction group

S203

For each historical instruction group, the historical instruction at the center point of the historical instruction group is determined as the core historical instruction

FIG. 2

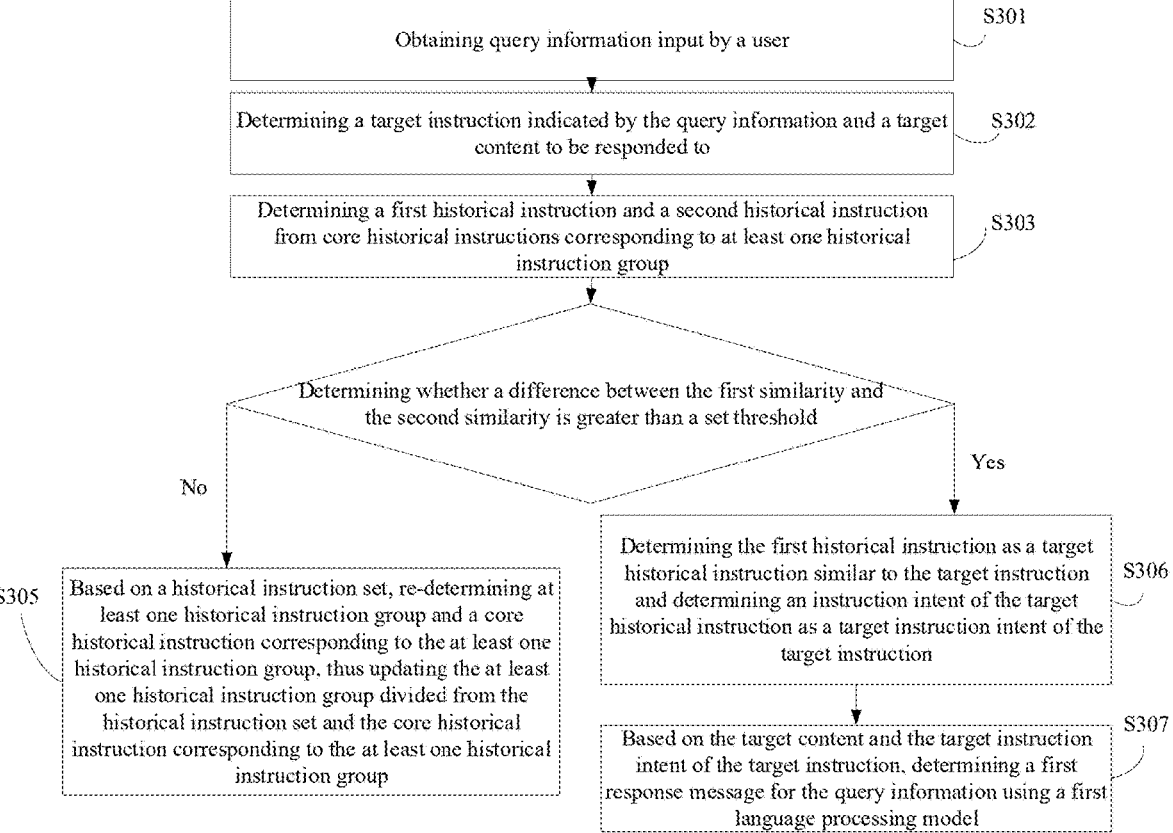

Obtaining query information input by a user — S301

Determining a target instruction indicated by the query information and a target content to be responded to — S302

Determining a first historical instruction and a second historical instruction from core historical instructions corresponding to at least one historical instruction group — S303

Determining whether a difference between the first similarity and the second similarity is greater than a set threshold No Yes Based on a historical instruction set, re-determining at least one historical instruction group and a core historical instruction corresponding to the at least one historical instruction group, thus updating the at least one historical instruction group divided from the historical instruction set and the core historical instruction corresponding to the at least one historical instruction group — S305

Determining the first historical instruction as a target historical instruction similar to the target instruction and determining an instruction intent of the target historical instruction as a target instruction intent of the target instruction — S306

Based on the target content and the target instruction intent of the target instruction, determining a first response message for the query information using a first language processing model — S307

FIG. 3

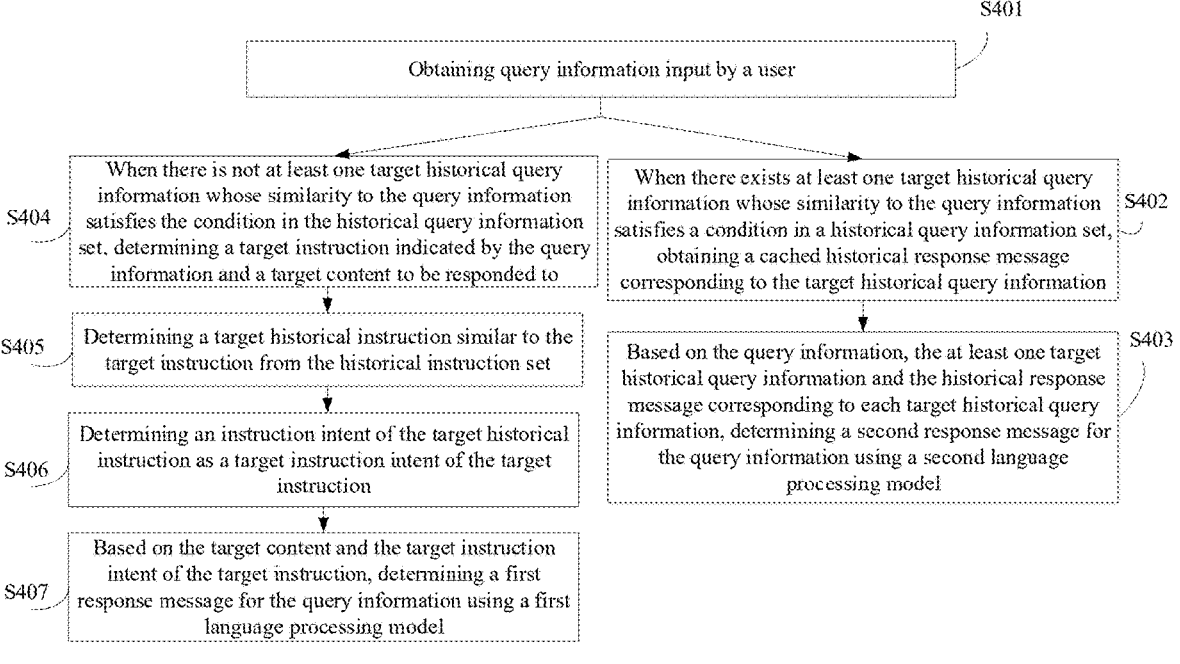

S401

Obtaining query information input by a user

S404 — When there is not at least one target historical query information whose similarity to the query information satisfies the condition in the historical query information set, determining a target instruction indicated by the query information and a target content to be responded to S402 — When there exists at least one target historical query information whose similarity to the query information satisfies a condition in a historical query information set, obtaining a cached historical response message corresponding to the target historical query information S405 — Determining a target historical instruction similar to the target instruction from the historical instruction set S403 — Based on the query information, the at least one target historical query information and the historical response message corresponding to each target historical query information, determining a second response message for the query information using a second language processing model S406 — Determining an instruction intent of the target historical instruction as a target instruction intent of the target instruction S407 — Based on the target content and the target instruction intent of the target instruction, determining a first response message for the query information using a first language processing model

FIG. 4

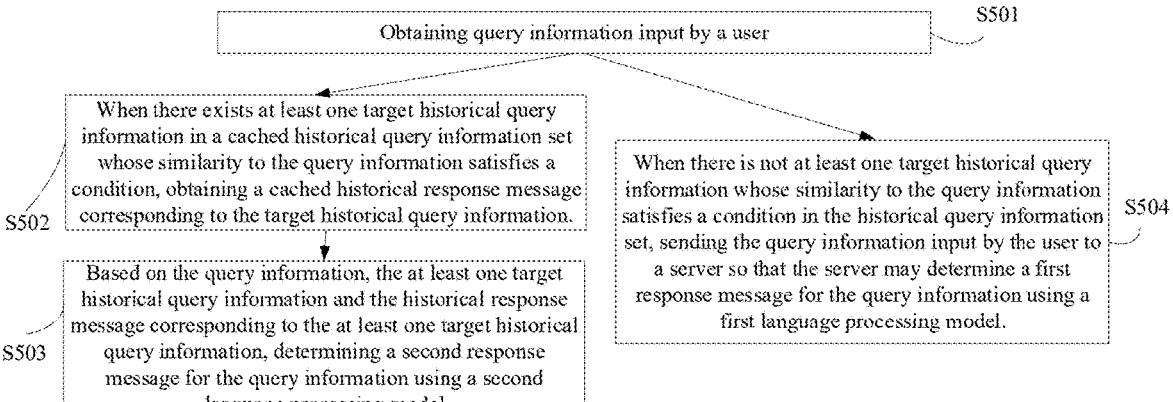

S501

Obtaining query information input by a user

S502 — When there exists at least one target historical query information in a cached historical query information set whose similarity to the query information satisfies a condition, obtaining a cached historical response message corresponding to the target historical query information.

S504 — When there is not at least one target historical query information whose similarity to the query information satisfies a condition in the historical query information set, sending the query information input by the user to a server so that the server may determine a first response message for the query information using a first language processing model.

S503 — Based on the query information, the at least one target historical query information and the historical response message corresponding to the at least one target historical query information, determining a second response message for the query information using a second language processing model

FIG. 5

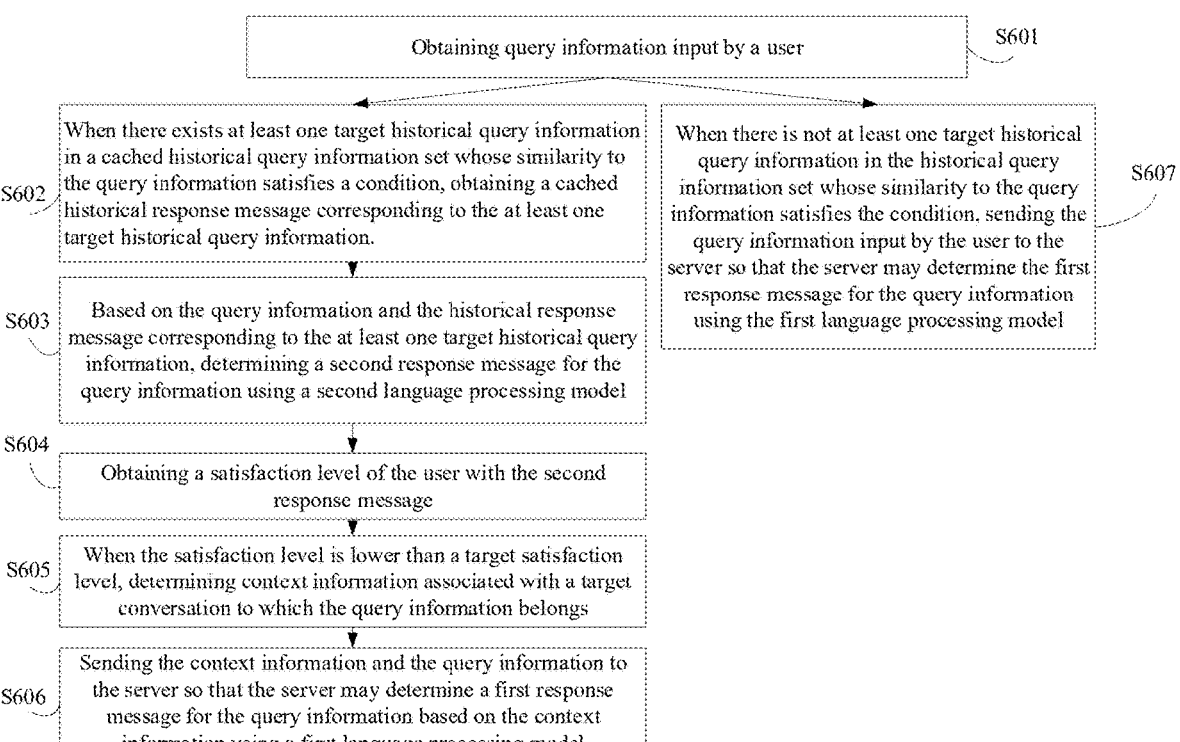

Obtaining query information input by a user — S601

When there exists at least one target historical query information in a cached historical query information set whose similarity to the query information satisfies a condition, obtaining a cached historical response message corresponding to the at least one target historical query information. — S602

Based on the query information and the historical response message corresponding to the at least one target historical query information, determining a second response message for the query information using a second language processing model — S603

Obtaining a satisfaction level of the user with the second response message — S604

When the satisfaction level is lower than a target satisfaction level, determining context information associated with a target conversation to which the query information belongs — S605

Sending the context information and the query information to the server so that the server may determine a first response message for the query information based on the context information using a first language processing model — S606

When there is not at least one target historical query information in the historical query information set whose similarity to the query information satisfies the condition, sending the query information input by the user to the server so that the server may determine the first response message for the query information using the first language processing model — S607

FIG. 6

801 An information obtaining unit

802 An information extraction unit

803 An instruction determining unit

804 An intent determining unit

805 A first response determining unit

901 Information obtaining unit

902 Information matching unit

903 Response determining unit

904 Information sending unit

METHODS AND ELECTRONIC DEVICES FOR DETERMINING RESPONSE MESSAGE

CROSS-REFERENCES TO RELATED APPLICATIONS

The present disclosure claims priority to Chinese Patent Application No. 202311385773.1, filed on Oct. 24, 2023, the content of which is incorporated herein by reference in its entirety.

TECHNICAL FIELD

The present disclosure relates to the field of natural language processing technology and, more specifically, relates to methods and electronic devices for determining response message.

BACKGROUND

In some conversational interaction scenarios, electronic devices providing conversational interaction services may need to generate a response message based on query information input by the user.

Electronic devices generally utilize language processing models to analyze the query information and determine the response message. To accurately determine the response message, the language processing models within the electronic devices typically include a large number of parameters, which results in a substantial consumption of computational resources each time the response message is determined.

SUMMARY

One aspect of the present disclosure provides a method for determining a response message. The method includes: determining a target instruction indicated by a query information from a user and a target content to be responded to, the target instruction being configured to indicate a processing requirement for the target content; determining a target historical instruction similar to the target instruction from a historical instruction set, the historical instruction set including at least one historical instruction determined based on historical query information input by the user; determining an instruction intent corresponding to the target historical instruction as a target instruction intent of the target instruction; and determining a first response message for the query information using a first language processing model based on the target content and the target instruction intent of the target instruction.

Another aspect of the present disclosure provides a method for determining a response message. The method includes: in response to a query information input from a user, and when there exists at least one target historical query information in a historical query information set whose similarity to the query information satisfies a condition, obtaining a historical response message, that is cached, corresponding to the at least one target historical query information, and determining a second response message for the query information using a second language processing model based on the query information, the at least one target historical query information and the historical response message corresponding to the at least one target historical query information, the historical query information set including historical query information obtained before the query information; and when there is not at least one target historical query information in the historical query information set whose similarity to the query information satisfies the condition, sending the query information input by the user to a server.

Another aspect of the present disclosure provides an electronic device. The electronic device includes one or more processors and a memory containing a computer program that, when being executed, causes the one or more processors to perform: determining a target instruction indicated by a query information from a user and a target content to be responded to, the target instruction being configured to indicate a processing requirement for the target content; determining a target historical instruction similar to the target instruction from a historical instruction set, the historical instruction set including at least one historical instruction determined based on historical query information input by the user; determining an instruction intent corresponding to the target historical instruction as a target instruction intent of the target instruction; and determining a first response message for the query information using a first language processing model based on the target content and the target instruction intent of the target instruction.

Another aspect of the present disclosure provides an electronic device. The electronic device includes one or more processors and a memory containing a computer program that, when being executed, causes the one or more processors to perform: in response to a query information input from a user, and when there exists at least one target historical query information in a historical query information set whose similarity to the query information satisfies a condition, obtaining a historical response message, that is cached, corresponding to the at least one target historical query information, and determining a second response message for the query information using a second language processing model based on the query information, the at least one target historical query information and the historical response message corresponding to the at least one target historical query information, the historical query information set including historical query information obtained before the query information; and when there is not at least one target historical query information in the historical query information set whose similarity to the query information satisfies the condition, sending the query information input by the user to a server.

BRIEF DESCRIPTION OF THE DRAWINGS

In order to further illustrate the technical solutions in the embodiments of the present disclosure, a brief introduction is provided below for the drawings. Apparently, the drawings in the following description are merely some embodiments of the present disclosure. Those of ordinary skill in the art may also obtain other drawings based on the provided drawings without exerting creative efforts.

FIG. 1 illustrates a flowchart of a method for determining a response message provided by an embodiment of the present disclosure;

FIG. 2 illustrates an implementation diagram for determining a historical instruction group and the core historical instruction of the historical instruction group;

FIG. 3 illustrates another flowchart of a method for determining a response message provided by an embodiment of the present disclosure;

FIG. 4 illustrates yet another flowchart of a method for determining a response message provided by an embodiment of the present disclosure;

FIG. 5 illustrates yet another flowchart of a method for determining a response message provided by an embodiment of the present disclosure;

FIG. 6 illustrates yet another flowchart of a method for determining a response message provided by an embodiment of the present disclosure;

DETAILED DESCRIPTION

Figure 7:
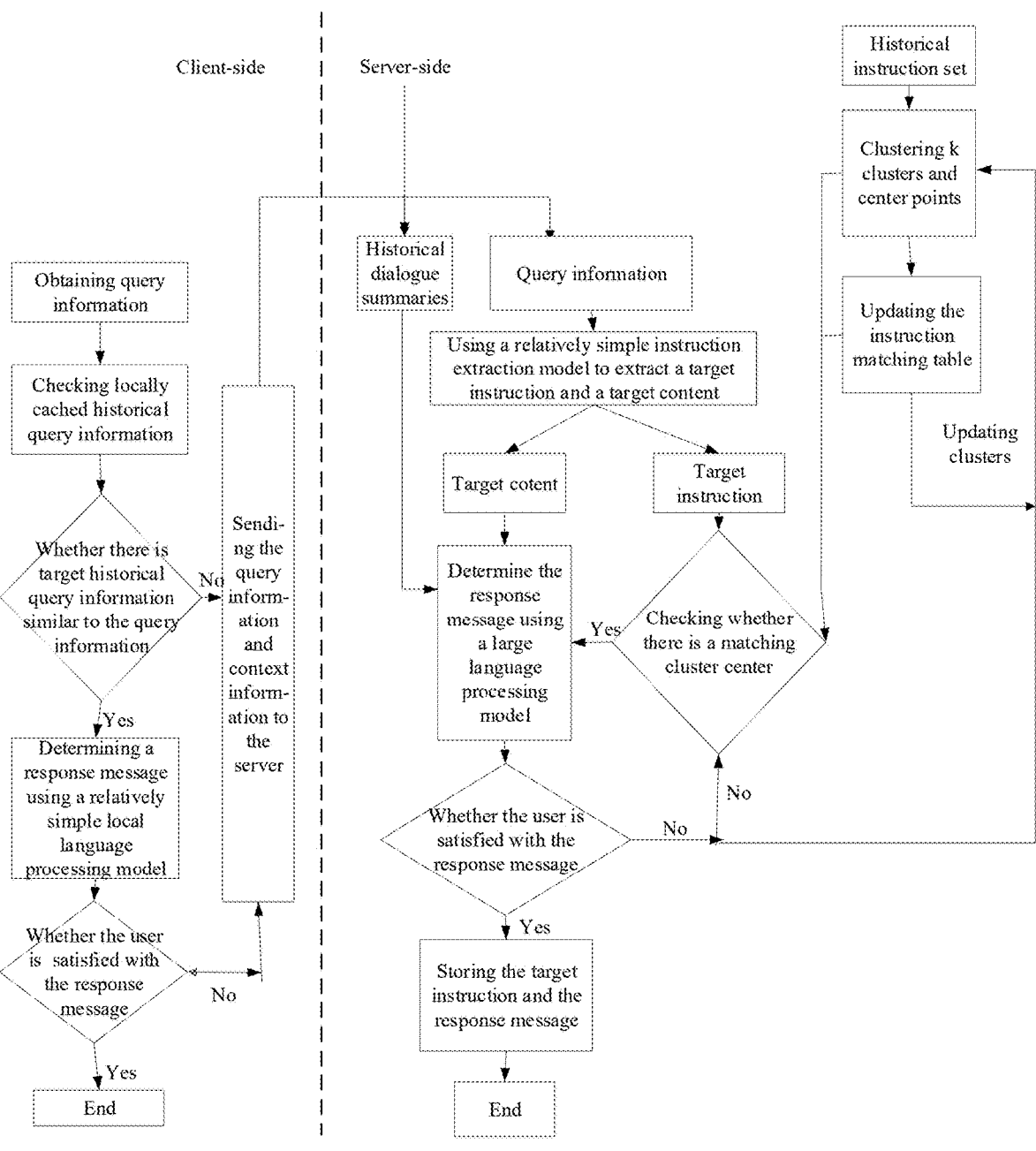
FIG. 7 illustrates a schematic diagram of the framework for implementing a method for determining a response message in an application scenario in an embodiment of the present disclosure.

The technical solutions in the embodiments of the present disclosure will be described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without creative efforts fall within the scope of protection of the present disclosure.

FIG. 1 illustrates a flowchart of a method for determining a response message provided by an embodiment of the present disclosure. The method of this embodiment may be applied to an electronic device. The electronic device may be a server, such as an application server corresponding to an application that provides conversational services; the electronic device may also be a client device or a terminal device, such as a terminal device providing conversational services or a client device hosting the application providing conversational services.

The method of this embodiment may include:

S101, obtaining query information input by a user.

Where, the query information is the question information input by the user in a conversational interaction that requires a response.

In the present disclosure, the query information input by the user in a conversation may be in the form of voice query information, text query information, or query information including images, emails, or other forms of content, without limitation.

For example, the query information may be a query sentence.

Another example is that the query information may include both images and text, such as an image with a question and the text being a description that explains the meaning of the image.

Of course, the query information may also include images including text or other forms of information, without limitation.

It is understood that when this embodiment of the present disclosure is applied to the server-side, the query information may be sent to the server by the client device hosting the conversational interaction application.

S102, determining a target instruction indicated by the query information and a target content to be responded to.

It is understood that the query information directly or implicitly includes query intent of the user and specific content information that needs to be resolved or answered in response to the query intent. To accurately determine the appropriate response message for the query information, it is necessary to identify the query intent corresponding to the query information and the target content that should be provided in response to the query intent.

Based on this, the target instruction determined by the query information is used to indicate a processing requirement for the target content. The target instruction thus reflects the user's needs expressed in the query information and an expected response direction.

The target content is a content that needs to be resolved or processed, based on the query intent indicated by the target instruction.

For example, if the query information is "Please help me translate this text into English: Today I am very happy," the target instruction of the query information is "Translate Chinese to English," and the target content to be responded to, indicated by the target instruction, is "Today I am very happy."

Another example, if the query information is "Help me check the meaning of 'you are yyds'," the target instruction of the query information is "Query meaning," and the target content is "you are yyds."

Yet another example, if the query information is "Summarize the key points of this email ##," the target instruction of the query information is "Summarize key information," and the target content is "The content of email ##."

In the present disclosure, determining the target instruction and the target content from the query information may be done through semantic analysis or other methods, without limitation.

In one possible implementation, to improve the efficiency and accuracy of determining the target instruction and the target content, the present disclosure may pre-train an information extraction model, such as using a plurality of information samples labeled with instruction and content to train a neural network model or other machine learning models and determining the trained model as the information extraction model.

Based on this, the present disclosure may input the query information into the information extraction model to obtain the target instruction and the target content extracted from the query information by the information extraction model.

Specifically, if the query information obtained in step S101 is in a non-text form, the present disclosure may also convert the query information into a text form, and the specific conversion method is not limited.

S103, determining a target historical instruction similar to the target instruction from a historical instruction set.

The historical instruction set includes at least one historical instruction determined based on historical query information input by the user in the past. The historical instruction set is stored locally in the electronic device.

The historical query information refers to query information received and processed by the electronic device before the current query information is received.

The historical instruction corresponding to the historical query information is an instruction determined by the electronic device based on the historical query information, which reflects a processing requirement corresponding to the historical query information.

A specific implementation of determining the historical instruction corresponding to the historical query information may be similar to the implementation of determining the target instruction of the query information, and can refer to the related description above, which will not be repeated here.

In the present disclosure, there may be various ways to determine whether the historical instruction is similar to the target instruction. For example, in one implementation, a similarity between the historical instruction and the target instruction may be calculated. If the similarity between the target instruction and the historical instruction satisfies a set similarity condition (e.g., the similarity between the target instruction and the historical instruction is the highest, the similarity exceeds a set threshold, or the similarity exceeds the threshold and is the highest), the target instruction may be considered similar to the historical instruction.

There may be various ways to calculate the similarity between the target instruction and the historical instruction. For example, a feature vector corresponding to the target instruction may be determined, and then the similarity between the feature vector for the target instruction and the historical instruction may be calculated, such as using cosine similarity, Euclidean distance, or other calculation methods, without limitation.

Of course, other methods of determining whether the historical instruction is similar to the target instruction may also be used, without limitation.

S104, determining an instruction intent corresponding to the target historical instruction as a target instruction intent of the target instruction.

The instruction intent corresponding to the target historical instruction refers to an intent indicated by the target historical instruction, which is used to represent a processing requirement expressed by the target historical instruction.

In the present disclosure, the instruction intent of the historical instruction refers to an intent analyzed by the electronic device based on the historical instruction, and the instruction intent of the historical instruction may be pre-stored locally in the electronic device. For example, after the electronic device obtains the historical query information corresponding to the historical instruction, during the process of determining a response message corresponding to the historical query information, the determined historical instruction of the historical query information and the instruction intent corresponding to the historical instruction may be saved.

The instruction intent of the historical instruction may be determined by the electronic device by performing similarity matching between the historical instruction and other historical instructions, or it may be determined based on an analysis of the historical instruction or the historical query information corresponding to the historical instruction using a language processing model in the electronic device, without limitation.

It is understood that, to determine a appropriate response message for the query information, the electronic device needs to first use a language processing model to determine an intent of the query information. However, due to the high complexity of the language processing model, especially a large language model on the server side, the process of determining the intent of the query information by the language processing model inevitably consumes computational resources and time. In the present disclosure, since the computation required for matching the target instruction with the historical instruction is relatively small and requires less time, the instruction intent of the historical instruction similar to the target instruction may be used as the target instruction intent of the target instruction. This eliminates the need to use large language models or other language processing models to determine the instruction intent of the query information, thus reducing the resources required to determine the instruction intent.

S105, based on the target content and the target instruction intent of the target instruction, determining a first response message for the query information using a first language processing model.

For example, the target content and the target instruction intent corresponding to the target instruction are input into the first language processing model, and the first language processing model may determine and output an appropriate first response message for the target content based on the target instruction intent.

To facilitate distinction, the response message determined using the first language processing model is referred to as the first response message.

The first response message includes a response content given for the query information. For example, it may be an answer to the question raised by the query information, the result of a query requested by the query information, or a translation result based on a translation request indicated by the query information.

The first response message may be in text form, such as a response sentence. Of course, depending on the query information, the first response message may also be in other forms, without limitation.

In the present disclosure, the first language processing model may be any language model capable of determining a response message based on the query information, without limitation. For example, the first language processing model may be a large language model or other natural language processing models, without limitation.

It is understood that the query information input by the same user in a specific scenario or within a certain period may exhibit similarity, and similar query information tends to cluster in a short period. Based on this, the present disclosure may determine the target instruction intent of the query information by leveraging the instruction intent of the historical instruction indicated by previously determined historical query information.

Of course, if the user is a new user or submits a new type of query information, it is possible that no similar target historical instruction exists in the historical instruction set corresponding to the query information. In such cases, the present disclosure may also employ conventional methods, i.e., directly determine the first response message based on the query information using the first language processing model.

It can be seen that, considering the high complexity of the first language processing model in the electronic device when determining the response sentence for the query information, which results in higher resource consumption, the present disclosure first determines the target instruction indicated by the query information and the target content to be responded to, and then determines the target instruction intent of the target instruction by matching it with the instruction intent corresponding to the similar historical instruction in the historical instruction set. Based on this, the first language processing model in the electronic device can directly determine the response message based on the target instruction intent of the target instruction and the target content to be responded to, without the need for complex analysis of the query information to determine the instruction intent. Naturally, this reduces the resource consumption caused by the first language processing model when determining the instruction intent of the query information and lowers the resource consumption required for determining the response sentence based on the language processing model in the electronic device.

Moreover, since the complexity of analyzing the query information and determining the response sentence by the language processing model is high, the time taken to determine the response message is also relatively long. In the present disclosure, by first determining the target instruction intent of the target instruction indicated by the query information based on the instruction intent of the historical instruction, there is no need to analyze the instruction intent of the query information using the language processing model. Naturally, this reduces the number of processes required by the language processing model and lowers the complexity of determining the response message corresponding to the query information, thus reducing the time taken by the language processing model to determine the response sentence. This is beneficial for shortening the time required to determine the response sentence corresponding to the query information.

It is understood that as the historical query information processed by the electronic device continues to increase, the number of historical instructions in the historical instruction set stored in the electronic device will also increase, thereby increasing the complexity of determining the target historical instruction similar to the target instruction, which may result in longer processing times for determining the target historical instruction.

Based on this, in order to further reduce the complexity and time required to determine the target historical instruction similar to the target instruction, the present disclosure may pre-divide the historical instructions in the historical instruction set into at least one historical instruction group. Different historical instruction groups correspond to different instruction intent categories, with each instruction intent category used to represent a specific type or category of instruction intent.

The instruction intents of the historical instructions within the same historical instruction group are similar, meaning that the instruction intents of all historical instructions in the same historical instruction group belong to the instruction intent category corresponding to that historical instruction group.

Each historical instruction group also corresponds to a core historical instruction, where an instruction intent of the core historical instruction may be used to represent the instruction intent category corresponding to the historical instruction group. For example, the instruction intent category corresponding to the historical instruction group may be "Chinese to English translation," and the instruction intent of the core historical instruction may be "translating Chinese to English."

On this basis, the present disclosure may determine the target historical instruction similar to the target instruction from the core historical instruction corresponding to at least one historical instruction group. The target historical instruction belongs to the core historical instruction corresponding to the at least one historical instruction group.

A specific implementation of determining the core historical instruction similar to the target instruction may be similar to a process of determining the historical instruction similar to the target instruction described earlier and will not be repeated here.

It is understood that since the number of historical instruction groups is relatively much smaller than the number of historical instructions in the historical instruction set, matching the target instruction only with the core historical instruction corresponding to each historical instruction group can reduce the amount of computation for similarity calculations, which naturally reduces the consumption of computational resources and time.

In the present disclosure, there may be multiple possible implementation methods for determining which historical instruction group each historical instruction in the historical instruction set belongs to, as well as determining the core historical instruction for each historical instruction group.

For example, the present disclosure may pre-calculate the similarity between the historical instructions in the historical instruction set and group the historical instructions with similarities that meet certain conditions into a historical instruction group. The core historical instruction within the historical instruction group may be randomly determined or chosen as the historical instruction with the highest similarity to other historical instructions in the historical instruction group.

Alternatively, the present disclosure may cluster the historical instructions in the historical instruction set, grouping similar historical instructions into the same cluster group (also referred to as a cluster), with each cluster group being a historical instruction group, and a historical instruction at the center point of each cluster group may serve as the core historical instruction corresponding to the historical instruction group.

Taking the clustering method for determining a historical instruction group and a core historical instruction as an example, one implementation will be described. As shown in FIG. 2, it illustrates a schematic diagram of one implementation for determining the historical instruction group and the core historical instruction of the historical instruction group in the embodiment of the present disclosure. The method of this embodiment may include:

S201, respectively determining a feature vector for a historical instruction in a historical instruction set.

The feature vector for the historical instruction may be obtained by vector encoding, without specific limitations.

For example, the present disclosure may pre-construct a vocabulary, which includes identification codes corresponding to a plurality of different instructions. On this basis, after determining an identification code corresponding to the historical instruction, the identification code is multiplied by a pre-determined vector transformation matrix to obtain the vector encoding of the historical instruction, i.e., the feature vector for the historical instruction.

It is understood that converting each historical instruction in the historical instruction set into a feature vector allows obtaining a feature vector set corresponding to the historical instruction set $S_{emb}=[E_0, E_1, \ldots, E_{m-1}]$. $E_i$ represents a feature vector corresponding to historical instruction i, and $$E_i = \left[ e_i^0, e_i^1, \ldots, e_i^{n-1} \right],$$

where i is any natural number from 0 to m−1, and m−1 is a total number of historical instructions in the historical instruction set. $e_i^t$ represents the t-th element in the feature vector $E_i$, t is any natural number from 0 to n−1, and n−1 is a dimension of the feature vector corresponding to the historical instruction.

S202, based on the feature vector, clustering each historical instruction in the historical instruction set to obtain at least one historical instruction group.

Through clustering, historical instructions with similar feature vectors may be clustered into one group, and the historical instruction at the center point of each group may be determined. Each group may be considered a historical instruction group, and each historical instruction group may include at least one historical instruction.

During clustering, the present disclosure uses cosine similarity or other similarity calculation methods to determine the similarity between the feature vectors for any two historical instructions, without limitation.

In the present disclosure, the clustering algorithm for clustering historical instructions may be set as needed, without limitation. For example, the present disclosure may use the k-means clustering algorithm to cluster at least one historical instruction group based on the feature vectors for each historical instruction.

Take the example of clustering at least one historical instruction group using the k-means clustering algorithm:

First, k historical instructions may be selected as k center points from a plurality of historical instructions, where the value of k can be set as needed.

Second, the similarity between a feature vector for each historical instruction and a feature vector for each historical instruction used as a center point may be calculated.

For example, taking cosine similarity as an example, the cosine similarity cos $(E_i, E_j)$ between the feature vector $E_i$ corresponding to the historical instruction i and the feature vector $E_j$ corresponding to the historical instruction j may be calculated using the following formula:

$$\cos (E_i, E_j) = \frac{E_i \cdot E_j}{|E_i| \cdot |E_j|}$$

Where, j is any natural number from 0 to m−1.

Next, based on the similarity between the feature vector for each historical instruction and the feature vector for each center point, the historical instructions are grouped to obtain k historical instruction groups.

Then, for each historical instruction group, the center point of the historical instruction group is recalculated.

Finally, based on the updated center points of each historical instruction group, the process of determining the k historical instruction groups is repeated until the k historical instruction groups and their center points no longer change, thereby finally obtaining k historical instruction groups and k center points of the historical instruction group.

Of course, the above description is provided to facilitate understanding, using the k-means clustering algorithm as an example. The method is equally applicable to other algorithms used to determine historical instruction groups, without limitation.

It is understood that feature vectors for historical instructions may reflect the needs and intents of the historical instructions. By clustering historical instructions with similar feature vectors into one group, historical instructions with similar instruction intents are grouped into the same historical instruction group, so that the instruction intents of the historical instructions in one historical instruction group belong to the same instruction intent category.

S203, for each historical instruction group, the historical instruction at the center point of the historical instruction group is determined as the core historical instruction.

As previously described, each clustered historical instruction group corresponds to a historical instruction at the center point, which serves as the center point of the historical instruction group. In the present disclosure, the historical instruction corresponding to the center point of the historical instruction group is determined as the core historical instruction, enabling the instruction intent of the core historical instruction to more accurately reflect the instruction intent category of the historical instruction group.

It is understood that FIG. 2 merely illustrates one implementation where the historical instructions in the historical instruction set are divided into at least one historical instruction group, and other implementations are also applicable to the present disclosure, which will not be further described here.

It is understood that for each historical instruction group, if the instruction intent of the core historical instruction in the historical instruction group has been pre-analyzed by the electronic device, the correspondence between the core historical instruction and its instruction intent may be directly stored. For example, the present disclosure may construct an instruction matching table, in which the instruction intent corresponding to the core historical instruction in different historical instruction groups may be stored.

If the instruction intent of the core historical instruction in the historical instruction group has not yet been determined, the present disclosure may also input the core historical instruction into the first language processing model to obtain the instruction intent of the core historical instruction as output by the first language processing model. Then, the correspondence between the core historical instruction and its corresponding instruction intent may be saved.

It is understood that as the number of historical instructions continues to increase, if the historical instruction groups are not updated in a timely manner, the instruction intent of the core historical instructions in each historical instruction group may no longer accurately reflect the instruction intent categories that the historical instructions in the historical instruction set may involve.

Based on this, the present disclosure may further determine whether there remains a clear distinction between the historical instruction groups based on the similarity between the target instruction and the core historical instructions of the historical instruction groups. If not, it indicates that the historical instruction groups need to be updated.

The following explanation is provided in conjunction with FIG. 3. As shown in FIG. 3, it illustrates another flowchart of a method for determining a response message provided by an embodiment of the present disclosure. The method of this embodiment may include:

S301, obtaining query information input by a user.

S302, determining a target instruction indicated by the query information and a target content to be responded to.

Where, the target instruction is used to indicate a processing requirement for the target content.

S303, determining a first historical instruction and a second historical instruction from core historical instructions corresponding to at least one historical instruction group. The first historical instruction has the highest similarity with the target instruction and exceeds a set threshold, and the second historical instruction has the lowest similarity with the target instruction.

Where, the similarity between a core historical instruction and the target instruction may be calculated by determining the similarity between a feature vector for the core historical instruction and a feature vector for the target instruction. The specific details can be referenced from the previous description and will not be repeated here.

S304, based on a first similarity between the first historical instruction and the target instruction and a second similarity between the second historical instruction and the target instruction, determining whether a difference between the first similarity and the second similarity is greater than a set threshold. If not, proceed to S305; and if yes, proceed to S306.

S305, based on a historical instruction set, re-determining at least one historical instruction group and a core historical instruction corresponding to the at least one historical instruction group, thus updating the at least one historical instruction group divided from the historical instruction set and the core historical instruction corresponding to the at least one historical instruction group. Based on the newly determined core historical instruction corresponding to the at least one historical instruction group, return to execute step S303.

It is understood that since the first historical instruction is the core historical instruction with the highest similarity to the target instruction, and the second historical instruction is the core historical instruction with the lowest similarity to the target instruction, if the difference between the first similarity (between the first historical instruction and the target instruction) and the second similarity (between the second historical instruction and the target instruction) is small, this indicates that the differences between the core historical instructions in the historical instruction groups, as well as the instruction intents represented by the core historical instructions, are small. This results in different core historical instructions not accurately representing distinct instruction intent categories, highlighting an unreasonable division of the historical instruction groups.

In this case, using an instruction intent of the first historical instruction as a target instruction intent of the target instruction could result in a significant deviation in the determined target instruction intent.

Based on this, if the difference between the first similarity (between the first historical instruction and the target instruction) and the second similarity (between the second historical instruction and the target instruction) is smaller than the set threshold, the present disclosure requires re-dividing historical instructions in the historical instruction set into historical instruction groups to obtain an updated version of the at least one historical instruction group.

In this step, a specific implementation of dividing the historical instructions in the historical instruction set into the at least one historical instruction group can be referenced from the previous description and will not be repeated here.

S306, determining the first historical instruction as a target historical instruction similar to the target instruction and determining an instruction intent of the target historical instruction as a target instruction intent of the target instruction.

S307, based on the target content and the target instruction intent of the target instruction, determining a first response message for the query information using a first language processing model.

As previously described, if the difference between the first similarity (between the first historical instruction and the target instruction) and the second similarity (between the second historical instruction and the target instruction) is significant, it indicates that the current division of the historical instruction groups is still reasonable, and there is a clear distinction between the historical instruction groups. Therefore, the instruction intent of the first historical instruction, which has the highest similarity to the target instruction, may represent the instruction intent of the target instruction.

The above steps S306 and S307 can be referenced from the related description of the previous embodiments and will not be repeated here.

It is understood that, in this embodiment and the previous embodiments, the present disclosure may also add the target instruction as a historical instruction to the historical instruction set.

It is understood that, in any embodiment of the present disclosure, after determining the first response message, the present disclosure may further output the first response message.

If the electronic device is a server, after determining the first response message, the first response message may be output via a client device. For example, the server sends the first response message to the client device, and the client device can output the first response message. For instance, in the context of a conversation interface where the client device obtains the query information input by the user, the first response message may be output to the conversation interface corresponding to the user's target conversation.

If the electronic device is a client device or a terminal device, the electronic device may directly output the first response message after determining the first response message.

It is understood that to further improve the accuracy of the response message determined for the query information, after the electronic device outputs the first response message, the present disclosure may also obtain the satisfaction level of the user with the first response message.

When the satisfaction level of the user with the first response message is lower than the target satisfaction level, it indicates that the first response message deviates from the user's expected response message, and the accuracy is relatively low. This further suggests that the instruction intent of the target historical instruction cannot accurately express the instruction intent of the target instruction. In this case, the present disclosure may also re-determine at least one historical instruction group and the core historical instruction of each historical instruction group based on the historical instructions in the historical instruction set, to update the historical instruction groups and the core historical instructions of the historical instruction groups. Based on the updated core historical instructions of the historical instruction groups, the target historical instruction similar to the target instruction may be re-determined, and the related operations can be performed again, without further elaboration.

The specific implementation of obtaining the satisfaction level of the user with the first response message may vary and is not limited.

For example, if the electronic device is a server, the present disclosure may provide satisfaction options to the client device, allowing the user to select an option based on their satisfaction with the first response message. The server may detect the satisfaction option selected by the user through the client device or obtain the satisfaction option sent by the client device to determine the satisfaction level.

Alternatively, if the electronic device is a client device or a terminal device, the electronic device may display a satisfaction survey option in the conversation interface, and the satisfaction level of the user for the first response message may be determined based on the selected option.

It is understood that in the embodiments of the present disclosure, after the electronic device determines the first response message, it may also store the target instruction and the instruction intent of the target instruction as a historical instruction and its corresponding instruction intent. For example, if the satisfaction level of the user with the first response message exceeds the target satisfaction level, the target instruction and its instruction intent may be stored.

It is understood that the higher the accuracy of the language processing model used by the electronic device to determine the response message corresponding to the query information, the higher the structural complexity of the language processing model. This results in relatively greater consumption of computational resources and longer time required to determine the response message.

Based on this, in order to reduce the computational resources consumed by the electronic device when determining the response message, under the premise of configuring the first language processing model in the electronic device, the present disclosure may also configure a second language processing model in the electronic device, where the structural complexity of the second language processing model is lower than that of the first language processing model.

On this basis, the present disclosure may first use the second language processing model to determine the response message for the query information. Additionally, to improve the accuracy of the response message determined by the second language processing model, the present disclosure may also integrate the historical response message for historical query information similar to the query information, to comprehensively determine the response message corresponding to the query information.

The following explanation is provided in conjunction with FIG. 4. As shown in FIG. 4, it illustrates a flowchart of a method for determining a response message provided in an embodiment of the present disclosure, which may be applied to the electronic device mentioned above. The method of this embodiment may include:

S401, obtaining query information input by a user.

S402, when there exists at least one target historical query information whose similarity to the query information satisfies a condition in a historical query information set, obtaining a cached historical response message corresponding to the target historical query information.

The historical query information set includes historical query information obtained before the query information is obtained.

In one alternative method, considering that the difference between the query information input by different users may be relatively large, while the relevance of the query information input by the same user may be relatively high, the historical query information set may include historical query information obtained from the same user before obtaining the query information.

In the present disclosure, while caching the historical query information, the electronic device also caches the response message determined by the device for the historical query information. For ease of distinction, the response message corresponding to the historical query information is referred to as the historical response message.

The implementation of determining the similarity between the historical query information and the query information is similar to the method used for determining the similarity between different instructions described earlier. For example, the feature vector for the query information may be determined and based on the feature vectors for the query information and the historical query information, algorithms such as cosine similarity can be used to determine the similarity between the query information and the historical query information.

In this embodiment, if the similarity between the historical query information and the query information satisfies the condition, it indicates that the historical query information is similar to the query information. For instance, the similarity condition may be that the similarity between the historical query information and the query information exceeds a set threshold, without limitation.

S403, based on the query information, the at least one target historical query information and the historical response message corresponding to each target historical query information, determining a second response message for the query information using a second language processing model.

For example, each target historical query information, its corresponding historical response message, and the query information may be input into the second language processing model to obtain the second response message output by the second language processing model.

The structural complexity of the second language processing model is lower than that of a first language processing model.

For example, the first language processing model may be a relatively complex large language model, while the second language model may be a relatively simple natural language processing model.

It is understood that, compared to the first language processing model, the second language processing model has a relatively simpler structure. Therefore, although using the second language processing model to process the query information allows for more efficient determination of the response message and reduces the time required, the accuracy may be slightly lower.

Based on this, to improve the accuracy of the response message determined by the second language processing model, the present disclosure may also integrate the response message corresponding to the target historical query information, which is similar to the query information, to comprehensively determine the applicable response message for the query information.

In the present disclosure, the historical response message corresponding to the historical query information may be determined by the electronic device using the first language processing model or using the second language processing model, without limitation.

It is understood that, since the target historical query information is similar to the current query information, the response message corresponding to the target historical query information is also necessarily related to the response message corresponding to the query information. Therefore, using the second language processing model to refer to the target historical query information and its corresponding historical response message to comprehensively determine the response message corresponding to the query information helps to improve the matching degree of the response message determined for the query information, thereby improving the accuracy of the determined response message.

In the present disclosure, for ease of distinction, the response message corresponding to the query information determined by the second language processing model is referred to as the second response message.

It is understood that, after determining the second response message, the electronic device may also output the second response message so that the user can be informed of the second response message. The method of outputting the second response message is the same as the method of outputting the first response message described earlier, and the specific details can be referenced from the previous description and will not be repeated here.

S404, when there is not at least one target historical query information whose similarity to the query information satisfies the condition in the historical query information set, determining a target instruction indicated by the query information and a target content to be responded to.

The target instruction is used to indicate a processing requirement for the target content.

The implementation of determining the target instruction and the target content can be referenced from the related description of the previous embodiments and will not be repeated here.

S405, determining a target historical instruction similar to the target instruction from the historical instruction set.

The historical instruction set includes at least one historical instruction determined based on the historical query information input by the user in the past.

S406, determining an instruction intent of the target historical instruction as a target instruction intent of the target instruction.

S407, based on the target content and the target instruction intent of the target instruction, determining a first response message for the query information using a first language processing model.

The steps S405 to S407 can be referenced from the related description of the previous embodiments and will not be repeated here.

In the present disclosure, when in the historical query information set, there exists at least one target historical query information that is similar to the obtained query information, the present disclosure may determine the response message corresponding to the query information using the second language processing model, based on the historical response message for the target historical query information and the query information. The second language processing model has a relatively simple structure. This reduces the resources and time required to determine the response message using a complex first language processing model. Moreover, since the second language processing model integrates the response message corresponding to the target historical query information, which is similar to the query information, the matching degree of the response message for the query information determined by the second language processing model can be effectively improved, thereby naturally enhancing the accuracy of the determined second response message.

In one possible implementation, to ensure that the response message provided for the query information is accurate, the present disclosure may obtain the satisfaction level of the user with the second response message after determining the second response message.

For example, after outputting the second response message, the electronic device may present a satisfaction selection option associated with the second response message in the target conversation interface displaying the second response message. The satisfaction selection option may include options representing different levels of satisfaction. The user may select the appropriate option based on their satisfaction level, and the electronic device may determine the satisfaction level based on the selected option.

It is understood that the method for determining the satisfaction level of the user with the second response message is similar to the method for determining the satisfaction level of the user with the first response message, as previously described.

When the satisfaction level of the user with the second response message is lower than the target satisfaction level, the present disclosure may trigger the operation to determine the target instruction indicated by the query information and the target content to be responded to. The electronic device may then determine the first response message for the query information using the first language processing model, i.e., determining the target historical instruction similar to the target instruction from the historical instruction set, determining the instruction intent of the target historical instruction as the target instruction intent of the target instruction, and based on the target instruction intent and the target content, determining the first response message using the first language processing model.

A target satisfaction level may be set as needed. For instance, when the satisfaction level is numerical, the target satisfaction level could be a set value, such as 60 out of a maximum of 100. When the satisfaction level is represented by different grades, the target satisfaction level could be a set target satisfaction grade, such as 6 on a scale of 1-10, where a lower number indicates lower satisfaction.

Furthermore, when the satisfaction level of the user with the second response message is lower than the target satisfaction level, to further improve the ability of the electronic device to determine the first response message that better meets the user's needs using the first language processing model, the present disclosure may also determine context information associated with a target conversation to which the query information belongs. The target conversation to which the query information belongs refers to a conversation in which the user inputs the query information. For example, when a user starts a conversation, the terminal device will display a conversation interaction interface, and query information input by the user and a response message displayed for the query information are both considered part of interaction information related to the conversation. The context information may reflect the interaction information in the target conversation before the query information.

For example, the context information may include one or more of the following: target historical query information preceding a prompt in the target conversation, a historical response message corresponding to the target historical query information, and semantic summary information of the historical conversation interactions. The semantic summary information may be determined based on a target historical query statement and a historical response statement corresponding to the target historical query statement, such as summary information that expresses a theme of historical conversation interactions, extracted from various target historical query statements and their corresponding historical response statements.

Based on this, the electronic device may determine the first response message for the query information using the first language processing model, based on the context information, the target content and the target instruction intent of the target instruction.

It is understood that the context information reflects a conversation interaction content between the user and the electronic device before the query information, and the conversation interaction content may assist in determining an expected response content to the query information. Based on this, when combining the context information with the target instruction intent and the target content, the first language processing model may more accurately determine an expected first response message for the query information.

It is understood that in the above embodiments, the electronic device may be a server, a client device, or a terminal device. In practical applications, considering the hardware performance limitations of client devices or terminal devices, which may not be suitable for running large-scale language models.

The present disclosure may only configure the second language processing model in the client device while configuring the first language processing model on the server side. The client device may determine the response message for the query information using the second language processing model to reduce network resource consumption and the resource and time consumption associated with using the larger first language processing model on the server side.

Only when the client device determines that it is unable to accurately determine the response message using the second language processing model, will it call the first language processing model on the server to determine the response message for the query information.

The following description is provided in conjunction with FIG. 5. As shown in FIG. 5, it illustrates another flowchart of the method for determining a response message provided in the embodiment of the present disclosure. This embodiment of the method may be applied to a client device and may include:

S501, obtaining query information input by a user.

The specific form of the query information may be referenced from the previous embodiments and will not be repeated here.

For the client device, the query information may be obtained through a conversation interaction interface associated with the current user's target conversation and may include one or more media formats such as text or voice.

S502, when there exists at least one target historical query information in a cached historical query information set whose similarity to the query information satisfies a condition, obtaining a cached historical response message corresponding to the target historical query information.

The historical query information set is cached locally on the client device. The historical query information set includes historical query information obtained before the query information.

As previously described, as an optional method, the historical question information set may include historical query information input by the user before the query information. This historical query information may be from the same target conversation or from previous conversations, without limitation.

It is understood that the specific implementation for determining the target historical query information whose similarity to the query information satisfies the condition can be referenced from step S402 in the embodiment as shown in FIG. 4 and will not be repeated here.

It should be noted that in previous embodiments, for a target instruction, a historical instruction similar to the target instruction is determined. However, different query information may indicate the same instruction (e.g., different queries may indicate translating Chinese to English). For query information, however, it is relatively less likely that the same or similar query information will be input by the same or different users. Therefore, the present disclosure does not directly determine historical query information similar to the query information, but only determines target historical query information whose similarity to the query information satisfies the condition.

For example, a similarity condition may be that the similarity exceeds a set threshold. The set threshold can be set relatively broadly. For instance, the similarity of the query information may require over 95%, whereas the similarity condition here may be satisfied with over 60%.

S503, based on the query information, the at least one target historical query information and the historical response message corresponding to the at least one target historical query information, determining a second response message for the query information using a second language processing model.

This step can also be referenced from the corresponding steps in the embodiment as shown in FIG. 4 and will not be repeated here.

S504, when there is not at least one target historical query information whose similarity to the query information satisfies a condition in the historical query information set, sending the query information input by the user to a server so that the server may determine a first response message for the query information using a first language processing model.

The structural complexity of the second language processing model is lower than that of the first language processing model. Therefore, it may be understood that compared to the first language processing model on the server, the second language processing model has relatively lower hardware performance requirements and consumes fewer computational resources and time, though the accuracy of the response message may be lower.

In this embodiment, when a local historical query information set cached by the client device does not include the target historical query information whose similarity to the query information satisfies the condition, using only the second language processing model locally may lead to a poor match between the determined response message and the user's query needs, resulting in lower accuracy. In this case, the client device will use the server to remotely determine a response message for the query information.

After the server receives the query information sent by the client device, it may process it as previously described for determining the first response message. For example, the server determines a target instruction and a target content to be responded to, where the target instruction indicates a processing requirement for the target content; determines a target historical instruction similar to the target instruction from a historical instruction set; determines an instruction intent of the target historical instruction as a target instruction intent; and based on the target instruction intent and the target content, determines a first response message using a first language processing model. Specific details can be referenced from the previous embodiments and will not be repeated here.

Similar to before, for ease of distinction, the response message determined by the client device using the second language processing model is referred to as the second response message, while the response message determined by the server using the first language processing model is referred to as the first response message.

In the present disclosure, when the client device detects that there is at least one target historical query information in the local cache whose similarity to the query information satisfies the condition, the client will determine the response message for the query information using the local second language processing model based on the target historical query information and its corresponding historical response message. Since the second language processing model has a relatively simple structure, determining the response message using the second language processing model reduces computational resource consumption and time consumption.

Additionally, when the client device determines the response message locally, there is no need to send the query information to the server, which reduces the consumption of bandwidth and resources associated with remote server processing and the time required for remote data transmission.

Only when there is no target historical query information similar to the query information on the client side will the client send the query information to the server to ensure that the response message corresponding to the query information is reliably and accurately determined.

Additionally, the server of the present disclosure adopts the related operations of the previous embodiments to determine the first response message for the query information, which also minimizes the resources and time required to determine the first response message. For details, refer to the previous description, which will not be repeated here.

It is understood that, to avoid deviations between the second response message determined by the client device based on the second language processing model and the response message expected by the user, the present disclosure may also obtain the satisfaction level of the user with the second response message after determining the second response message. If the satisfaction level is low, the server may be used again to determine the response message for the query information.

As shown in FIG. 6, it illustrates another flowchart of a method for determining a response message provided in an embodiment of the present disclosure. The method of this embodiment is applied to the client device and may include:

S601, obtaining query information input by a user.

S602, when there exists at least one target historical query information in a cached historical query information set whose similarity to the query information satisfies a condition, obtaining a cached historical response message corresponding to the at least one target historical query information.

The historical query information set includes historical query information obtained before the query information.

S603, based on the query information and the historical response message corresponding to the at least one target historical query information, determining a second response message for the query information using a second language processing model.

The above steps S601 to S603 can be referenced from the related descriptions in any previous embodiments and will not be repeated here.

S604, obtaining a satisfaction level of the user with the second response message.

For example, the client device outputs the second response message and provides a satisfaction selection option for the second response message. Based on the user's selection of the satisfaction option, the satisfaction level of the user with the second response message is determined.

S605, when the satisfaction level is lower than a target satisfaction level, determining context information associated with a target conversation to which the query information belongs.

The context information reflects interaction information in the target conversation before the query information.

For example, the context information may include one or more of the following: target historical query information preceding the prompt in the target conversation, a historical response message corresponding to the target historical query information, and semantic summary information of historical conversation interactions.

It is understood that if the satisfaction level of the user with the second response message is not lower than a set threshold, steps S605 and S606 do not need to be executed, and the process may simply wait for the user to input other query information or end the conversation.

S606, sending the context information and the query information to the server so that the server may determine a first response message for the query information based on the context information using a first language processing model.

The process for determining the first response message by the server can be referenced from the previous description. For example, the server determines a target instruction indicated by the query information and a target content to be responded to; determines a target historical instruction similar to the target instruction from a historical instruction set; determines an instruction intent of the target historical instruction as a target instruction intent of the target instruction; and based on the target instruction intent, the target content, and the context information, determines the first response message for the query information using the first language processing model.

It is understood that after sending the context information to the server, the first language processing model on the server may refer to the context information to comprehensively determine the first response message for the query information, which helps to more accurately determine the first response message that matches the query information.

It is understood that after the server determines the first response message, the server may also send the first response message to the client device. Accordingly, the client device may output the first response message.

Furthermore, the client device may also update the context information associated with the target conversation based on the query information and the first response message. For example, the query information and the first response message may be added to the context information, or the semantic summary information of the query information and the first response message may be determined and added to the context information.

S607, when there is not at least one target historical query information in the historical query information set whose similarity to the query information satisfies the condition, sending the query information input by the user to the server so that the server may determine the first response message for the query information using the first language processing model.

The structural complexity of the second language processing model is lower than that of the first language processing model on the server.

Step S607 can be referenced from the related description of previous embodiments and will not be repeated here.

For ease of understanding, the interaction process between a client device and a server side is explained below in connection with a specific implementation of a method for determining a response message in the present disclosure.

As shown in FIG. 7, it illustrates a schematic framework diagram of one implementation of a method for determining a response message in the present disclosure.

In FIG. 7, the operations on the left side of the dashed line represent client-side operations, while those on the right side of the dashed line represent server-side operations.

As seen from the client-side operations, after obtaining query information, the client device first checks whether there is target historical query information similar to the query information in locally cached historical query information. If the target historical query information exists, the client device uses a relatively simple local language processing model, along with a response message for the target historical query information, to determine a response message for the query information.

At the same time, when the client device detects that the user is not satisfied with the response message determined by the client device, the client device may send the query information and some context information, such as dialogue history summaries of the current target conversation, to the server.

As shown on the right side of FIG. 7 for server-side operations:

The server may first cluster historical instructions in a historical user instruction set to obtain a plurality of clusters and a center of each cluster. The center of each cluster represents a core historical instruction of the cluster. The server stores the center of each cluster and its corresponding instruction intent to create an instruction matching table.

After the server receives the query information and conversation summary information sent by the client device, the server uses a relatively simple instruction extraction model to extract a target instruction and a target content from the query information.

For the target instruction, the server checks whether there is a matching cluster center. If so, an instruction intent of the core historical instruction of the cluster is obtained and used as a target instruction intent. The instruction intent, along with the target content and historical conversation summary, is input into the large language processing model on the server to determine the response message.

Of course, when the user on the client-side is satisfied with the response message determined by the server, the target instruction and the instruction intent may be stored as a historical instruction and an instruction intent corresponding to the historical instruction.

When the user on the client side is not satisfied with the response message determined by the server, or when no matching cluster center is found for the target instruction, the present disclosure may re-cluster historical instructions in the historical instruction set using clustering methods such as k-means, to update the clusters and their centers. The updated clusters and centers are then used to re-match the target instruction and perform the relevant operations.

Corresponding to a method for determining a response message on the electronic device side, the present disclosure also provides a device for determining a response message.

Figure 8:
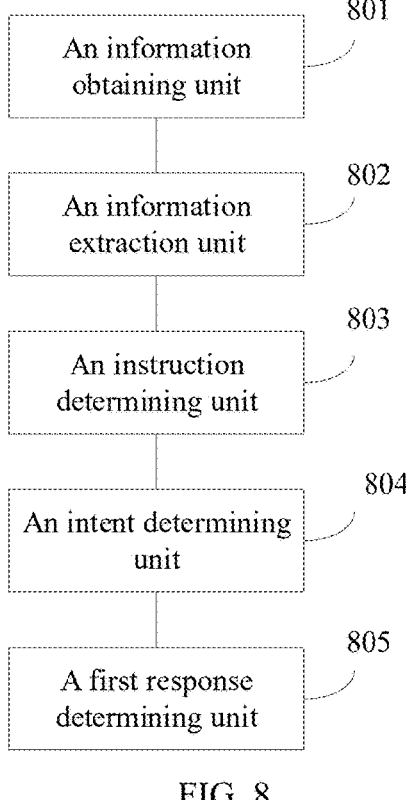
FIG. 8 illustrates a schematic diagram of a composition structure of an apparatus for determining a response message provided by an embodiment of the present disclosure.

As shown in FIG. 8, it illustrates a schematic diagram of a structural composition of an apparatus for determining a response message provided in an embodiment of the present disclosure. The apparatus of this embodiment may be applied to an electronic device, which can be a server, or a client device or a terminal device. The apparatus of this embodiment may include:

an information obtaining unit 801, configured to obtain query information input by the user;

an information extraction unit 802, configured to determine a target instruction indicated by the query information and a target content to be responded to, where the target instruction is configured to indicate a processing requirement for the target content;

an instruction determining unit 803, configured to determine a target historical instruction similar to the target instruction from a historical instruction set, where the historical instruction set includes at least one historical instruction determined based on historical query information input by the user in the past;

an intent determining unit 804, configured to determine an instruction intent of the target historical instruction as the target instruction intent of the target instruction; and a first response determining unit 805, configured to determine a first response message for the query information using a first language processing model, based on the target instruction intent and the target content.

In one possible implementation, the instruction determining unit includes an instruction determining sub-unit, which is configured to determine the target historical instruction similar to the target instruction from a core historical instruction corresponding to at least one historical instruction group. Where, at least one historical instruction group is divided from the historical instruction set and historical instruction groups correspond to different instruction intent categories. The instruction intent of the core historical instruction in the historical instruction group is used to represent the instruction intent category of the corresponding historical instruction group.

In another possible implementation, the apparatus further includes an instruction group determining unit. The instruction group determining unit is configured for determining the core historical instruction of the at least one historical instruction group. Where, the determining the core historical instruction is performed by the following method: respectively determining feature vectors for historical instructions in the historical instruction set; and clustering the historical instructions in the historical instruction set based on the feature vectors for the historical instructions, thereby obtaining at least one clustered historical instruction group and the core historical instruction at the center of each historical instruction group.

In another possible implementation, the instruction determining unit includes:

a first determining sub-unit, configured to determine, from the core historical instructions corresponding to at least one historical instruction group, a first historical instruction with the highest similarity to the target instruction and where the similarity exceeds a set threshold, and a second historical instruction with the lowest similarity to the target instruction. The similarity between the first historical instruction and the target instruction is a first similarity, and the similarity between the second historical instruction and the target instruction is a second similarity;

a second determining sub-unit, configured to determine the first historical instruction as the target historical instruction similar to the target instruction, when a difference between the first similarity and the second similarity exceeds a set threshold; and a regrouping trigger unit, configured to, when the difference between the first similarity and the second similarity does not exceed the set threshold, re-determine at least one historical instruction group and the core historical instruction of the historical instruction group based on the historical instruction set, and return to run the first determining sub-unit based on the newly determined core historical instruction corresponding to at least historical instruction group.

In another possible implementation, the apparatus further includes:

a similar information determining unit, configured to obtain a cached historical response message corresponding to the at least one target historical query information, when there exists the at least one historical query information in the historical query information set and the similarity between the historical query information and the query information satisfies a condition, where the historical query information set includes historical query information obtained before the query information; and a second response determining unit, configured to determine a second response message for the query information using a second language processing model, based on at least one target historical query information, the historical response message corresponding to the target historical query information, and the query information, where a structural complexity of the second language processing model is lower than that of a first language processing model.

The information extraction unit includes a first information extraction sub-unit. The first information extraction sub-unit is configured to determine the target instruction indicated by the query information and the target content to be responded to, when the similarity between the query information and at least one target historical query information in the historical query information set does not satisfy the condition.

In another possible implementation, the apparatus further includes: a satisfaction obtaining unit, configured to obtain the satisfaction level of the user with the second response message; and a context obtaining unit, configured to determine the context information associated with the target conversation to which the query information belongs, when the satisfaction level is lower than the target satisfaction level. The context information reflects the conversation interaction information in the target conversation before the query information.

The information extraction unit further includes a second information extraction unit. The second information extraction unit is configured to determine the target instruction indicated by the query information and the target content to be responded to, when the satisfaction level is lower than the target satisfaction level.

The first response determining unit includes a first response determining sub-unit. The first response determining sub-unit is configured to determine the first response message for the query information using the first language processing model, based on the context information, the target content and the target instruction intent of the target instruction.

Furthermore, an embodiment of the present disclosure also provides another apparatus for determining a response message.

Figure 9:
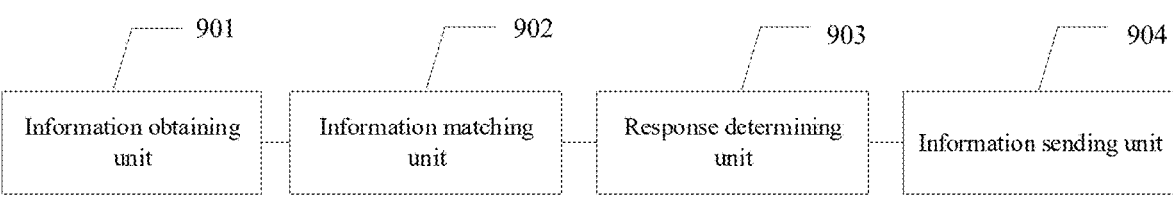
FIG. 9 illustrates yet another schematic diagram of a composition structure of another apparatus for determining a response message provided by an embodiment of the present disclosure.

FIG. 9 illustrates a schematic diagram of a structure of another apparatus for determining a response message provided by an embodiment of the present disclosure. The apparatus of this embodiment may be applied to a client device and may include:

an information obtaining unit 901, configured to obtain query information input by a user;

an information matching unit 902, configured to, when there exists at least one target historical query information in a cached historical query information set whose similarity to the query information satisfies a condition, obtain a cached historical response message corresponding to the at least one target historical query information, where the historical query information set includes historical query information obtained before the query information.

a response determining unit 903, configured to, based on the query information and the historical response message corresponding to the at least one target historical query information, determine a second response message for the query information using a second language processing model; and an information sending unit 904, configured to send the query information input by the user to a server when there is no target historical query information in the historical query information set that satisfies a similarity condition, so that the server may determine a first response message for the query information based on a first language processing model, where a structural complexity of the second language processing model is lower than that of the first language processing model.

In another possible implementation, the apparatus further includes:

a satisfaction obtaining unit, configured to obtain a satisfaction level of the user with the second response message;

a context determining unit, configured to determine context information associated with a target conversation to which the query information belongs, when the satisfaction level is lower than a target satisfaction level, where the context information reflects conversation interaction information in the target conversation before the query information; and an integrated sending unit, configured to send the context information and the query information to the server, so that the server may determine the first response message for the query information based on the context information using the first language processing model.

Figure 10:
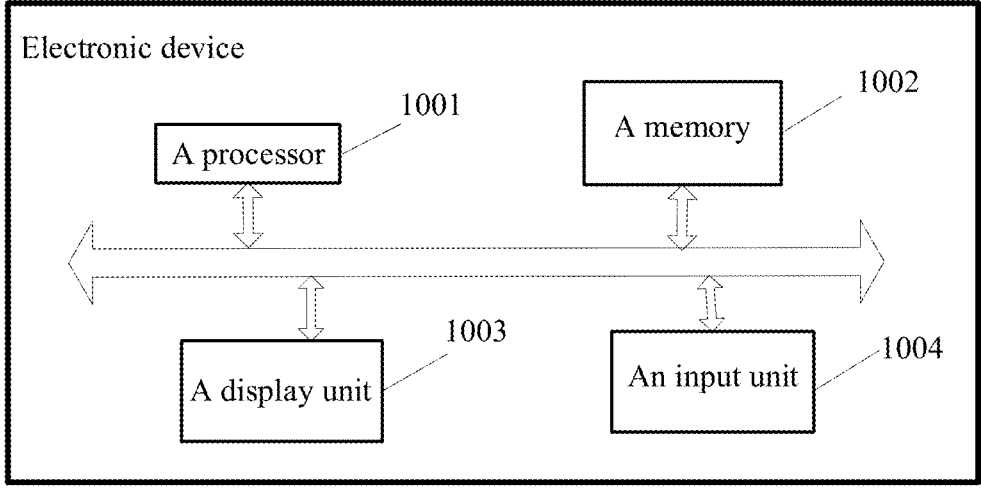
FIG. 10 illustrates a schematic diagram of the composition architecture of an electronic device provided by an embodiment of the present disclosure.

Furthermore, the present disclosure also provides an electronic device, as shown in FIG. 10. FIG. 10 illustrates a schematic diagram of a structure of the electronic device. The electronic device may be of any type of electronic device, and the electronic device at least includes a processor 1001 and a memory 1002. The processor 1001 is configured to execute a method for determining a response message in any of the embodiments described above. The memory 1002 is configured to store programs required for the processor to execute operations.

It is understood that the electronic device may also include a display unit 1003 and an input unit 1004.

Of course, the electronic device may have more or fewer components than those shown in FIG. 10, without limitation.

On the other hand, the present disclosure also provides a computer-readable storage medium. The computer-readable storage medium stores at least one instruction, at least one program, a code set, or an instruction set. The at least one instruction, the at least one program, the code set, or the instruction set is loaded and executed by a processor to implement a method for determining a response message as described in any of the above embodiments.

The present disclosure also provides a computer program. The computer program includes computer instructions stored in a computer-readable storage medium. When the computer program is run on an electronic device, the computer program is configured to execute a method for determining a response message as described in any of the above embodiments.

It is understood that in this disclosure, the terms "first," "second," "third," "fourth," etc. (if present) in the specification, claims, and the above figures are used to distinguish similar parts and are not necessarily intended to describe a specific order or precedence. It should be understood that such terms can be interchanged under appropriate circumstances so that the embodiments of the present disclosure described herein may be implemented in an order different from the illustrated examples.

It should be noted that each embodiment in this specification is described in a progressive manner, with emphasis placed on the differences from other embodiments. The similarities between the embodiments can be referred to in each case. Additionally, the features described in each embodiment in this specification can be replaced or combined with each other, enabling those skilled in the art to implement or use the present disclosure. For device-related embodiments, since they are fundamentally similar to method embodiments, the descriptions are relatively simplified. The relevant parts may be referred to in the sections describing the method embodiments.

Finally, it should also be noted that, in this document, relational terms such as "first", "second", "third" and "fourth" are only used to distinguish one entity or operation from another entity or operation and do not necessarily require or imply any actual relationship or order between these entities or operations. Moreover, the terms "include" or "comprise" and any other variations thereof are intended to cover non-exclusive inclusion, such that a process, method, article, or device that includes a series of elements not only includes those elements but also may include other elements not explicitly listed, or may include elements inherent to such a process, method, article, or device. In the absence of further limitations, an element defined by the phrase "including a . . . " does not exclude the presence of additional identical elements in the process, method, article, or device that includes the element.

The above description of the disclosed embodiments enables those skilled in the art to implement or use the present disclosure. Various modifications to these embodiments will be apparent to those skilled in the art, and the general principles defined herein may be applied to other embodiments without departing from the spirit or scope of the present disclosure. Thus, the present disclosure is not to be limited to the embodiments shown herein but is to be accorded the broadest scope consistent with the principles and novel features disclosed herein.

The above are merely example embodiments of the present disclosure. It should be noted that, for those skilled in the art, various modifications and improvements may be made without departing from the principles of the present disclosure, and such modifications and improvements should also be considered as within the scope of the present disclosure.

What is claimed is:

1. A method for determining a response message, comprising:

determining a target instruction indicated by a first query information from a user and a target content to be responded to, wherein the target instruction is configured to indicate a processing requirement for the target content;

determining a target historical instruction similar to the target instruction from a historical instruction set, wherein the historical instruction set comprises at least one historical instruction determined based on historical query information input by the user;

determining an instruction intent corresponding to the target historical instruction as a target instruction intent of the target instruction;

determining that there does not exist at least one target historical query information in a first historical query information set whose similarity to the first query information satisfies a condition, wherein the first historical query information set comprises historical query information obtained before the first query information;

in response to there not existing at least one target historical query information in the first historical query information set whose similarity to the first query information satisfies the condition, determining a first response message for the first query information using a first language processing model based on the target content and the target instruction intent of the target instruction;

receiving a second query information from the user;

determining that there exists at least one target historical query information in a second historical query information set whose similarity to the second query information satisfies the condition, wherein the second historical query information set comprises historical query information obtained before the second query information; and in response to there existing at least one target historical query information in the second historical query information set whose similarity to the second query information satisfies the condition, obtaining a cached historical response message corresponding to the at least one target historical query information, and determining a second response message for the second query information using a second language processing model, based on the second query information, the at least one target historical query information, and the cached historical response message corresponding to the at least one target historical query information, wherein a structural complexity of the second language processing model is lower than a structural complexity of the first language processing model, and structural complexity is characterized such that, for a same query information, the second language processing model consumes fewer computational resources to generate a corresponding response message than the first language processing model.

2. The method according to claim 1, wherein determining the target historical instruction similar to the target instruction from the historical instruction set comprises:

determining the target historical instruction similar to the target instruction from a core historical instruction corresponding to at least one historical instruction group, wherein the at least one historical instruction group is divided from the historical instruction set, with each historical instruction group corresponding to different instruction intent categories; and an instruction intent of the core historical instruction corresponding to the at least one historical instruction group is configured to represent an instruction intent category corresponding to the at least one historical instruction group.

3. The method according to claim 2, wherein determining the core historical instruction corresponding to the at least one historical instruction group comprises:

respectively determining a feature vector for a historical instruction in the historical instruction set; and clustering the historical instruction in the historical instruction set based on the feature vector for the historical instruction, thereby obtaining the at least one historical instruction group and the core historical instruction located at a center point of the at least one historical instruction group.

4. The method according to claim 1, further comprising:

obtaining a satisfaction level of the user with the second response message; and when the satisfaction level is lower than a target satisfaction level, determining context information associated with a target conversation to which the second query information belongs, wherein the context information reflects conversational interaction information before the second query information in the target conversation.

5. The method according to claim 4, further comprising:

when the satisfaction level is lower than the target satisfaction level, determining a second target instruction indicated by the second query information and a second target content to be responded to; determining a second target historical instruction similar to the second target instruction from the historical instruction set; and determining a second instruction intent corresponding to the second target historical instruction as a target instruction intent of the second target instruction.

6. The method according to claim 5, comprising:
determining a third response message for the second query information using the first language processing model based on the context information, the second target content, and the target instruction intent of the second target instruction.

7. The method according to claim 2, wherein determining the target historical instruction similar to the target instruction from the core historical instruction corresponding to the at least one historical instruction group comprises:
determining a first historical instruction with a highest similarity to the target instruction and a second historical instruction with a lowest similarity to the target instruction, from the core historical instruction corresponding to the at least one historical instruction group, wherein the highest similarity exceeds a set threshold, the highest similarity between the first historical instruction and the target instruction is a first similarity, and the lowest similarity between the second historical instruction and the target instruction is a second similarity; and
when a difference between the first similarity and the second similarity is greater than a set difference, determining the first historical instruction as the target historical instruction similar to the target instruction.

8. The method according to claim 7, further comprising:
when the difference between the first similarity and the second similarity is not greater than the set difference, re-determining the at least one historical instruction group and the core historical instruction corresponding to the at least one historical instruction group based on the historical instruction set, and returning to an operation of determining the first historical instruction and the second historical instruction based on the core historical instruction corresponding to the at least one historical instruction group which is newly determined.

9. A method for determining a response message, comprising:
in response to a second query information input from a user, at a client device, determining that there exists at least one target historical query information in a second historical query information set stored at the client device whose similarity to the second query information satisfies a condition, obtaining a cached historical response message corresponding to the at least one target historical query information, and determining a second response message for the second query information using a second language processing model executed at the client device based on the second query information, the at least one target historical query information, and the cached historical response message corresponding to the at least one target historical query information, wherein the second historical query information set comprises historical query information obtained before the second query information; and
in response to a first query information input from the user, at the client device, determining that there is not at least one target historical query information in a first historical query information set whose similarity to the first query information satisfies the condition, sending the first query information input by the user from the client device to a server, such that the server determines, using a first language processing model, a first response message for the first query information, wherein the first historical query information set comprises historical query information obtained before the first query information, wherein a structural complexity of the second language processing model is lower than a structural complexity of the first language processing model, and structural complexity is characterized such that, for a same query information, the second language processing model consumes fewer computational resources to generate a corresponding response message than the first language processing model.

10. The method according to claim 9, further comprising:
obtaining a satisfaction level of the user with the second response message; and
when the satisfaction level is lower than a target satisfaction level, determining context information associated with a target conversation to which the second query information belongs, and sending the context information and the second query information to the server, wherein the context information reflects conversation interaction information in the target conversation before the second query information.

11. An electronic device comprising one or more processors and a memory containing a computer program that, when being executed, causes the one or more processors to perform:
determining a target instruction indicated by a query information from a user and a target content to be responded to, wherein the target instruction is configured to indicate a processing requirement for the target content;
determining a target historical instruction similar to the target instruction from a historical instruction set, wherein the historical instruction set comprises at least one historical instruction determined based on historical query information input by the user;
determining an instruction intent corresponding to the target historical instruction as a target instruction intent of the target instruction;
determining whether there exists at least one target historical query information in a historical query information set whose similarity to the query information satisfies a condition, wherein the historical query information set comprises historical query information obtained before the query information;
in response to there not existing at least one target historical query information in the historical query information set whose similarity to the query information satisfies the condition, determining a first response message for the query information using a first language processing model based on the target content and the target instruction intent of the target instruction; and
in response to there existing at least one target historical query information in the historical query information set whose similarity to the query information satisfies the condition, obtaining a cached historical response message corresponding to the at least one target historical query information, and determining a second response message for the query information using a second language processing model, based on the query information, the at least one target historical query information, and the cached historical response message corresponding to the at least one target historical query information, wherein a structural complexity of the second language processing model is lower than a structural complexity of the first language processing model, and structural complexity is characterized such that, for same query information, the second language processing model consumes fewer computational resources to generate a corresponding response message than the first language processing model.

12. The device according to claim 11, wherein the one or more processors are further configured to perform:

determining the target historical instruction similar to the target instruction from a core historical instruction corresponding to at least one historical instruction group, wherein the at least one historical instruction group is divided from the historical instruction set, with each historical instruction group corresponding to different instruction intent categories; and an instruction intent of the core historical instruction corresponding to the at least one historical instruction group is configured to represent an instruction intent category corresponding to the at least one historical instruction group.

13. The device according to claim 12, wherein the one or more processors are further configured to perform:

respectively determining a feature vector for a historical instruction in the historical instruction set; and clustering the historical instruction in the historical instruction set based on the feature vector for the historical instruction, thereby obtaining the at least one historical instruction group and the core historical instruction located at a center point of the at least one historical instruction group.

14. The device according to claim 12, wherein the one or more processors are further configured to perform:

determining a first historical instruction with a highest similarity to the target instruction and a second historical instruction with a lowest similarity to the target instruction, from the core historical instruction corresponding to the at least one historical instruction group, wherein the highest similarity exceeds a set threshold, the highest similarity between the first historical instruction and the target instruction is a first similarity, and the lowest similarity between the second historical instruction and the target instruction is a second similarity; and when a difference between the first similarity and the second similarity is greater than a set difference, determining the first historical instruction as the target historical instruction similar to the target instruction.

15. The device according to claim 14, wherein the one or more processors are further configured to perform:

when the difference between the first similarity and the second similarity is not greater than the set difference, re-determining the at least one historical instruction group and the core historical instruction corresponding to the at least one historical instruction group based on the historical instruction set, and returning to an operation of determining the first historical instruction and the second historical instruction based on the core historical instruction corresponding to the at least one historical instruction group which is newly determined.

16. The device according to claim 11, wherein the one or more processors are further configured to perform:

obtaining a satisfaction level of the user with the second response message; and when the satisfaction level is lower than a target satisfaction level, determining context information associated with a target conversation to which the query information belongs, wherein the context information reflects conversational interaction information before the query information in the target conversation, and determining the target instruction indicated by the query information and the target content to be responded to; and determining the first response message for the query information using the first language processing model based on the context information, the target content, and the target instruction intent of the target instruction.

17. An electronic device comprising one or more processors and a memory containing a computer program that, when being executed, causes the one or more processors to perform:

in response to a query information input from a user, and when there exists at least one target historical query information in a historical query information set whose similarity to the query information satisfies a condition, obtaining a cached historical response message corresponding to the at least one target historical query information, and determining a second response message for the query information using a second language processing model based on the query information, the at least one target historical query information, and the cached historical response message corresponding to the at least one target historical query information, wherein the historical query information set comprises historical query information obtained before the query information; and when there is not at least one target historical query information in the historical query information set whose similarity to the query information satisfies the condition, sending the query information input by the user to a server, such that the server determines a first response message for the query information using a first language processing model, wherein a structural complexity of the second language processing model is lower than a structural complexity of the first language processing model, and structural complexity is characterized such that, for same query information, the second language processing model consumes fewer computational resources to generate a corresponding response message than the first language processing model.

18. The device according to claim 17, wherein the one or more processors are further configured to perform:

obtaining a satisfaction level of the user with the second response message; and when the satisfaction level is lower than a target satisfaction level, determining context information associated with a target conversation to which the query information belongs, and sending the context information and the query information to the server, wherein the context information reflects conversation interaction information in the target conversation before the query information.

* * * * *